(12) United States Patent
van der Greft

(10) Patent No.: US 6,477,752 B1
(45) Date of Patent: Nov. 12, 2002

(54) LOCK FOR A NECKLACE, BRACELET OR SUCH ORNAMENT, AS WELL AS AN END EYE FOR SUCH A LOCK

(76) Inventor: Nicolaas van der Greft, Hoofdstraat 64, Zetten 6671 CG (NL)

( * ) Notice: Subject to any disclaimer, the term of this patent is extended or adjusted under 35 U.S.C. 154(b) by 0 days.

(21) Appl. No.: 09/700,347

(22) PCT Filed: May 18, 1999

(86) PCT No.: PCT/NL99/00305

§ 371 (c)(1),
(2), (4) Date: Mar. 7, 2001

(87) PCT Pub. No.: WO99/59442

PCT Pub. Date: Nov. 25, 1999

(30) Foreign Application Priority Data

May 18, 1998 (NL) .............................. 1009195

(51) Int. Cl.[7] .............................. A44B 13/02
(52) U.S. Cl. ..................... 24/599.1; 24/599.4; 24/683; 403/316; 63/3.1
(58) Field of Search ............... 24/3.1, 3.4, 4, 24/68 J, 599.1, 599.4, 599.5, 599.9, 600.1, 600.2, 600.3, 600.8, 601.5, 653, 674, 681, 683, 691, 692, 698.1, 698.2, 698.3, 700–702; 59/86, 93, 95; 63/4, 15–15.2, 3, 3.1; 294/82.17–82.23; 403/315, 316, 353

(56) References Cited

U.S. PATENT DOCUMENTS

| | | | |
|---|---|---|---|
| 1,365,911 A | | 1/1921 | Goozey |
| 1,463,604 A | * | 7/1923 | Wagner .................. 24/599.1 X |
| 1,531,776 A | * | 3/1925 | Withers ..................... 24/599.1 |
| 1,754,043 A | * | 4/1930 | Port ....................... 24/599.1 X |
| 1,772,390 A | | 8/1930 | Evans |
| 3,280,428 A | * | 10/1966 | Luketa ................... 24/698.1 X |
| 4,000,627 A | * | 1/1977 | Wahlbeck .......................... 63/3 |
| 4,055,057 A | | 10/1977 | Kolman |
| 4,411,050 A | * | 10/1983 | Couture ................. 24/599.4 X |
| 5,479,795 A | * | 1/1996 | Neri .............................. 63/3.1 |
| 5,586,374 A | * | 12/1996 | Nishida ................. 24/599.4 X |
| 5,642,558 A | * | 7/1997 | Bodkin, Sr. ................ 63/3.1 X |
| 5,927,895 A | * | 7/1999 | Watanabe .................... 403/353 |
| 5,956,980 A | * | 9/1999 | Jenkins, Jr. .......... 240/600.1 X |
| 6,298,528 B1 | * | 10/2001 | Workman .................... 24/700 |

FOREIGN PATENT DOCUMENTS

| | | | |
|---|---|---|---|
| DE | | 36 36 130 C1 * | 7/1988 |
| WO | | WO 89/08998 | 10/1989 |

* cited by examiner

*Primary Examiner*—Anthony Knight
*Assistant Examiner*—Ruth C. Rodriguez
(74) *Attorney, Agent, or Firm*—Hoffman & Baron, LLP

(57) ABSTRACT

A lock (1) for a necklace, bracelet or such ornament, which lock is provided with a carbine hook (2) defining an eye-shaped space and with an end eye (3), which carbine hook (2) is provided with a hook portion (4) and a locking portion (5), which locking portion (5), in an open position of this locking portion, extends at least partly into the eye-shaped space (R) so that a passage (D) is formed in the carbine hook eye, through which passage the end eye (3) is movable to fix the end eye (3) to the carbine hook (2), to which end eye (3) a safety element is fixed, which locking portion, in an operative position of the end eye (3) relative to the carbine hook (2), cannot be brought into the open position, which safety element, in a swung position of the end eye (3) relative to the carbine hook (2), is moved out of the eye-shaped space (R) so that the locking portion can be brought into the open position.

6 Claims, 3 Drawing Sheets

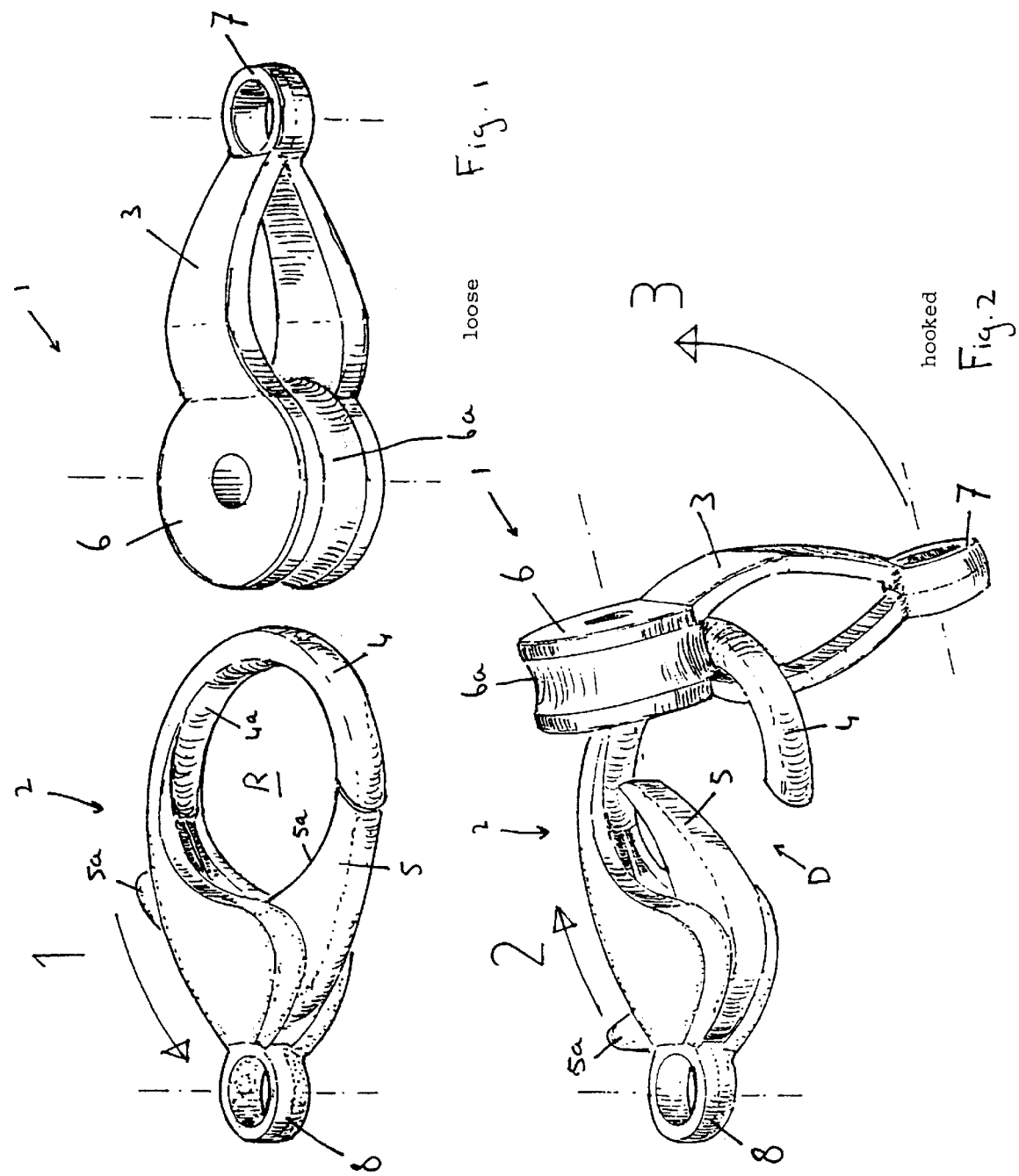

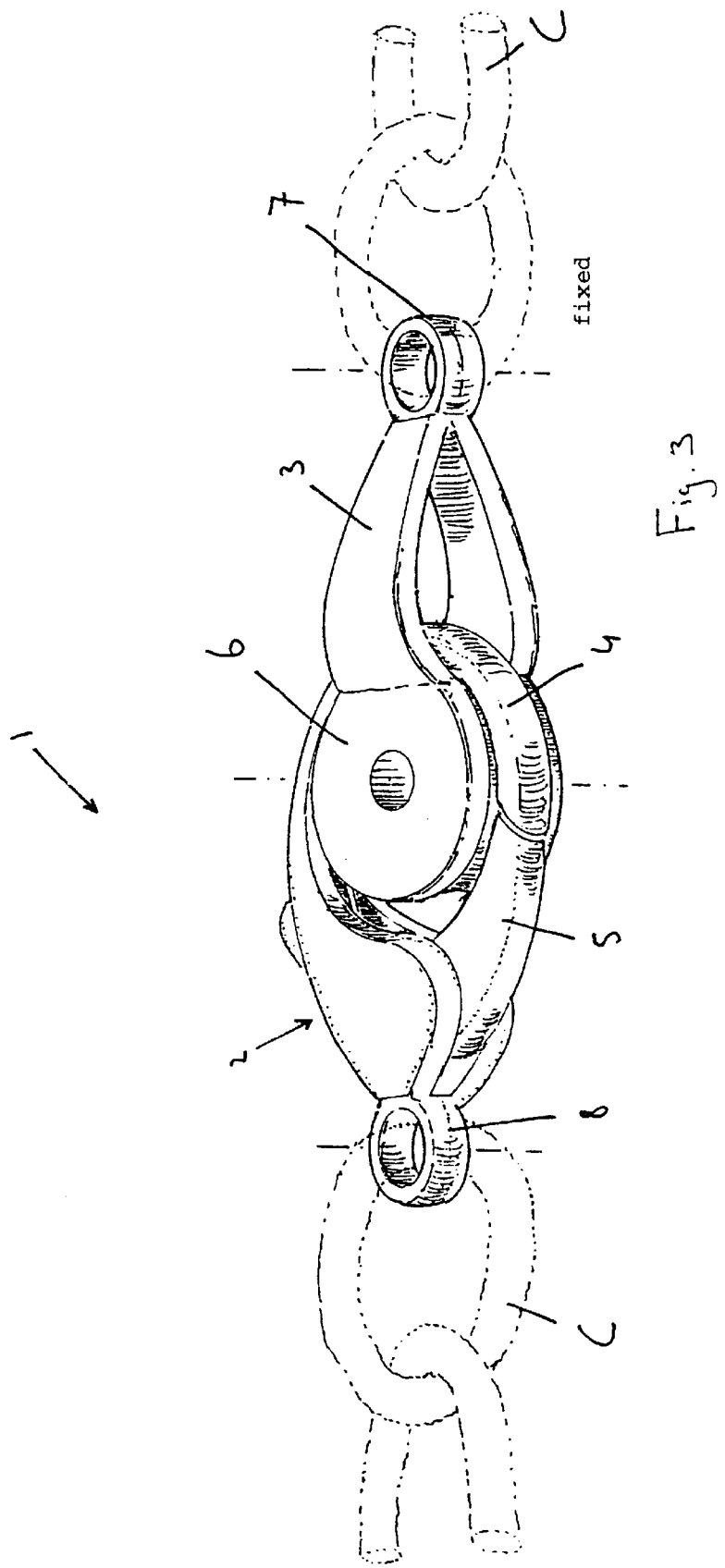

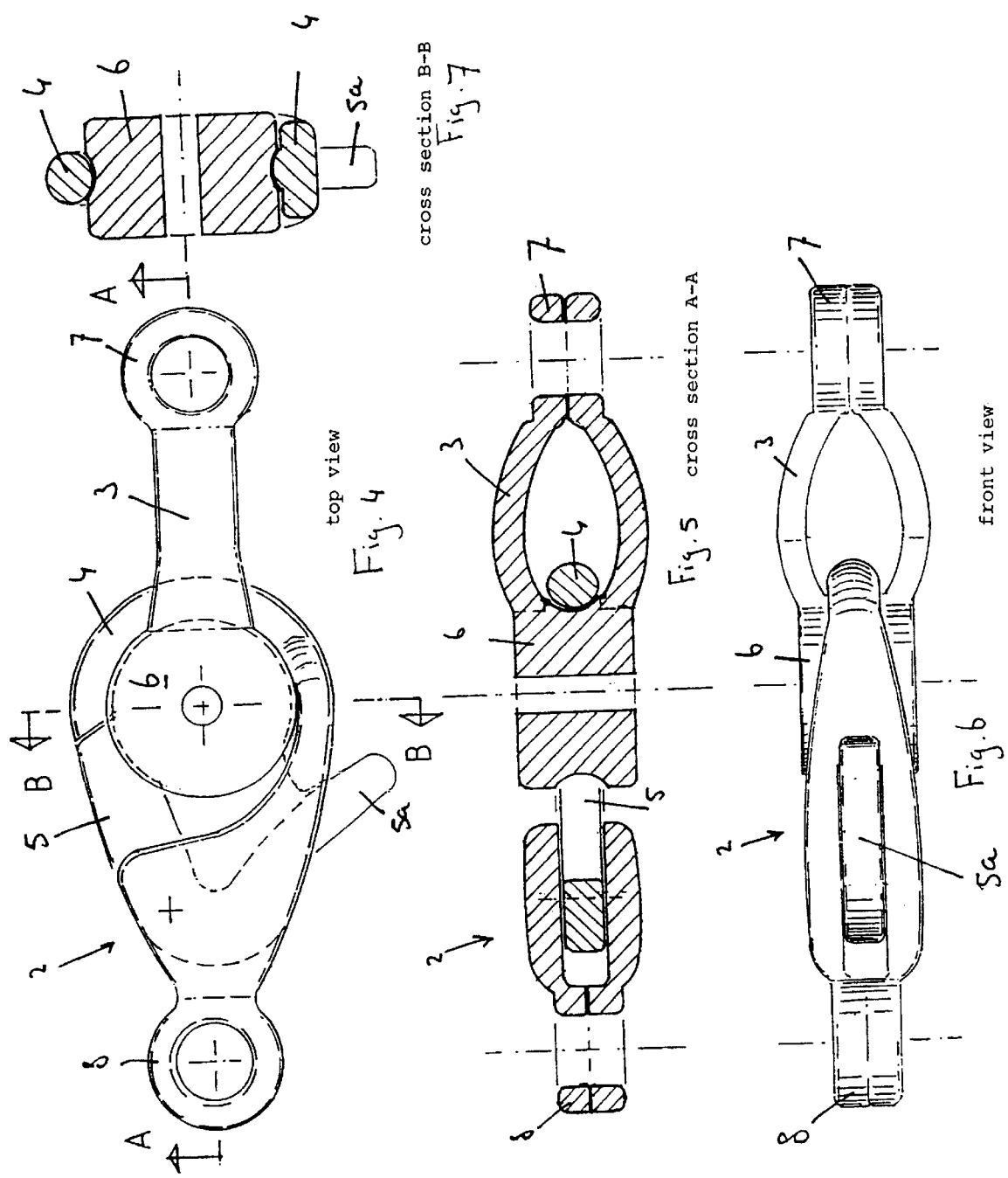

LOCK FOR A NECKLACE, BRACELET OR SUCH ORNAMENT, AS WELL AS AN END EYE FOR SUCH A LOCK

FIELD OF THE INVENTION

The invention relates to a lock for a necklace, bracelet or such ornament, which lock is provided with a carbine hook and an end eye capable of being hooked into the carbine hook, which carbine hook is provided with a hook portion and a locking portion swingably connected with the hook portion, which hook portion and locking portion, in a closed position of the locking portion, together form a carbine hook eye defining a substantially eye-shaped space, which locking portion, in an open position of this locking portion, extends at least partly into the above-mentioned eye-shaped space so that a passage is formed in the carbine hook eye, through which passage the end eye is movable to fix the end eye to the carbine hook.

DESCRIPTION OF THE RELATED ART

Such a lock is described in, e.g., DE-A 195 03 814.

Although an end eye is not shown in the known publication, it is generally known that such an end eye is attached to the end, remote from the carbine hook, of the necklace or bracelet.

It is a drawback of the known carbine hook lock that the end eye can easily come loose from the carbine hook. E.g., when the locking force of the locking portion is no longer sufficient owing to wear, the locking portion can easily assume an open or partly open position under the influence of vibrations or forces exerted on the ornament. In such an open or partly open position, the end eye may come loose from the hook portion. Accordingly, a loss of the ornament is quite possible with the known lock.

To prevent this loss, it is known to arrange a so-called safety chain at the lock. Such a safety chain is provided with a second lock and forms, in a closed position, a second connection between the ends of the ornament. It is a drawback of this solution that putting on the ornament is more laborious because two locks must be opened and closed again, namely the carbine hook and the lock of the safety chain. It is another drawback of a safety chain that it spoils the appearance of the ornament.

It is a further drawback of the known lock that the end eye can freely move in the carbine hook eye. When wearing the ornament, the end eye and the carbine hook eye constantly move relative to each other. Since this movement takes place in a relatively small part of the hook portion of the carbine hook, wear in that part will develop rather soon. Such wear results in that the carbine hook must be replaced after a few years of use.

SUMMARY OF THE INVENTION

It is an object of the invention to provide a lock. for a necklace, bracelet or such ornament of the type described in the opening paragraph which does not have the above-described drawbacks.

To achieve this object, the lock is characterized according to the invention in that a safety element is fixed to the end eye, which safety element, in an operative position of the end eye relative to the carbine hook, abuts with an outer circumferential edge substantially against an inner circumferential edge of the hook portion and the locking portion directed to the eye-shaped space so that the locking portion cannot be brought into the open position, and which safety element, in a swung position of the end eye relative to the carbine hook, is moved out of the eye-shaped space so that the locking portion can be brought into the open position.

The safety element may be designed as, e.g., a ring, bush or cylindrical disk which is firmly attached to the outer circumferential edge of the end eye. In the operative position of the end eye, the safety element is more or less fittingly received in the eye-shaped space which is defined by the hook portion and the locking portion of the carbine hook. First, this ensures that the locking portion of the carbine hook cannot be brought into the open position. For in this open position the locking portion extends at least partly into the eye-shaped space, and since the safety element is located therein, it is impossible to bring the locking portion into the open position. A second advantage is that in the operative position of the end eye the end eye and the carbine hook can hardly move relative to each other because the safety element is more or less enclosed in the eye-shaped space. Wear owing to movement of the end eye relative to the carbine hook is therefore reduced to a minimum. Moreover, the safety element does not spoil the appearance of the ornament at all.

According to a further elaboration of the invention, the safety element may even be provided with an ornamental element, such as, e.g., an ornamental stone. Such an addition results in a lock embellished as compared to the known locks.

The swung position of the end eye relative to the carbine hook—in which swung position the safety element is moved out of the eye-shaped space so that the locking portion can be brought into the open position—can only be assumed under normal conditions when the person wearing the ornament takes action.

BRIEF DESCRIPTION OF THE DRAWINGS

The invention will hereinafter be illustrated in more detail by a practical example, with reference to the accompanying drawings in which:

FIG. 1 shows the two parts of a practical example of the lock in uncoupled position;

FIG. 2 shows the lock in a partly coupled position;

FIG. 3 shows the lock in coupled position;

FIG. 4 is a top view of the lock shown in FIGS. 1–3;

FIG. 5 is a cross-sectional view on line A—A from FIG. 4;

FIG. 6 is a front view of the lock shown in FIGS. 4 and 5; and

FIG. 7 is cross-sectional view on line B—B from FIG. 4.

DETAILED DESCRIPTION OF THE INVENTION

The depicted practical example shows a lock 1 which is provided with a carbine hook 2 and an end eye 3. The carbine hook 2 is provided with a hook portion 4 and a locking portion 5. The locking portion 5 is swingably connected with the hook portion 4 and is provided with an operating portion 5a by means of which the locking portion 5 can be brought from the closed position shown in FIG. 1 to the open position shown in FIG. 2. The locking portion 5 is pretensioned in the closed position by means of a spring element (not shown). In this closed position, the hook portion 4 and the locking portion 5 form a carbine hook eye which defines a substantially eye-shaped space R. In the open position of the locking portion 5, this locking portion 5 extends at least partly into the above-mentioned eye-shaped space R. Thus a passage D is formed in the carbine hook eye, through which passage the end eye 3 is movable to attach the end eye 3 to the carbine hook 2. According to the invention, a safety element 6 is fixed to the end eye 3. In an operative position of the end eye 3 relative to the carbine hook 2 (FIG. 3), the safety element 6 abuts with an outer circumferential edge 6a substantially against an inner circumferential edge 4a, 5a, directed to the eye-shaped space, of respectively the hook portion 4 and the locking portion 5. As a result thereof, the locking portion 5 cannot be brought into the open position. In a swung position of the end eye 3 relative to the carbine hook 2, which swung position is shown in FIG. 2, the safety element 6 is moved out of the eye-shaped space R so that the locking portion 5 can be brought into the open position. Also for bringing the carbine hook 2 into the open position, the end eye 3 must first be brought into the swung position relative to the carbine hook 2, after which the operation of the locking portion 5 via the operating portion 5a thereof is possible.

In the present practical example, the end eye 3 and the safety element 6 are designed as a one-part integral member. Optionally, the safety element 6 may be provided with an ornamental element, such as, e.g., an ornamental stone. Other ornamental elements, too, such as engravings, are within the bounds of possibility. Although in the present practical example the safety element 6 is designed as a substantially cylindrical bush, it is also possible that the safety element 6 is designed as a ring or disk having an outer diameter which can be fittingly received in the eye-shaped space R of the carbine hook 2. In the present practical example, the safety element 6 is fixed to the end eye 3 at a first circumferential position of the end eye 3, and at an opposite second circumferential position of the end eye 3 an attaching eye 7 is arranged to which an end of a necklace or bracelet is attached. The carbine hook 2, too, is provided with such an attaching eye 8 for attaching an end of a necklace or bracelet.

It may be clear that the invention is not limited to the described practical example, but that various modifications are possible within the scope of the invention.

What is claimed is:

1. A lock for a necklace, bracelet or an ornament, which lock (1) is provided with a carbine hook (2) and an end eye (3) capable of being hooked into the carbine hook (2), which carbine hook is provided with a hook portion (4) and a locking portion (5) swingably connected with the hook portion (4), which hook portion (4) and locking portion (5), in a closed position of the locking portion (5), together form a carbine hook eye defining a substantially eye-shaped space (R), which locking portion (5), in an open position of this locking portion (5), extends at least partly into the above-mentioned eye-shaped space (R) so that a passage (D) is formed in the carbine hook eye, through which passage the end eye (3) is movable to fix the end eye (3) to the carbine hook (2), characterized in that a safety element (6) is fixed to the end eye (3), which safety element (6), in an operative position of the end eye (3) relative to the carbine hook (2), abuts with an outer circumferential edge (6a) substantially against an inner circumferential edge (4a, 5a) of the hook portion (4) and the locking portion (5) directed to the eye-shaped space (R) so that the locking portion (5) cannot be brought into the open position, and which safety element (6), in a swung position of the end eye (3) relative to the carbine hook (2), is moved out of the eye-shaped space (R) so that the locking portion (5) can be brought into the open position.

2. A lock according to claim 1, characterized in that the end eye (3) and the safety element (6) are designed as a one-part integral member.

3. A lock according to claim 1, characterized in that the safety element (6) is designed as a substantially cylindrical bush (6).

4. A lock according to claim 1, characterized in that the safety element (6) is fixed to the end eye (3) at a first circumferential position of the end eye (3), and that at an opposite second circumferential position of the end eye (3) an attaching eye (7) is arranged to which an end of a necklace or bracelet is attached.

5. A lock according to claim 1, characterized in that the safety element (6) is provided with an ornamental element, such as, e.g., an ornamental stone.

6. A lock according to claim 3, wherein said ornamental element is a stone.

* * * * *